US011878370B2

(12) United States Patent
Iwasaki

(10) Patent No.: US 11,878,370 B2
(45) Date of Patent: Jan. 23, 2024

(54) METHOD OF AND APPARATUS FOR SUPPLYING COOLING WATER TO LASER PROCESSING HEAD AND METHOD OF PRODUCING COOLING WATER

(71) Applicant: AMADA HOLDINGS CO., LTD., Kanagawa (JP)

(72) Inventor: Jun Iwasaki, Kanagawa (JP)

(73) Assignee: AMADA HOLDINGS CO., LTD., Kanagawa (JP)

( * ) Notice: Subject to any disclaimer, the term of this patent is extended or adjusted under 35 U.S.C. 154(b) by 281 days.

(21) Appl. No.: 16/867,979

(22) Filed: May 6, 2020

(65) Prior Publication Data

US 2020/0262006 A1    Aug. 20, 2020

Related U.S. Application Data

(63) Continuation of application No. 16/344,598, filed as application No. PCT/JP2017/035291 on Sep. 28, 2017, now abandoned.

(30) Foreign Application Priority Data

Oct. 27, 2016    (JP) ................................. 2016-210446
Jul. 14, 2017    (JP) ................................. 2017-137971

(51) Int. Cl.
*B23K 26/14*    (2014.01)
*B23K 26/146*    (2014.01)
(Continued)

(52) U.S. Cl.
CPC .......... *B23K 26/147* (2013.01); *B23K 26/146* (2015.10); *B23K 26/703* (2015.10); *B23K 37/003* (2013.01); *B23Q 11/1038* (2013.01)

(58) Field of Classification Search
CPC .. B23K 26/146; B23K 26/147; B23K 26/703; B23K 37/003; B23K 26/1462; B23Q 11/1038
(Continued)

(56) References Cited

U.S. PATENT DOCUMENTS 5,297,657 A *    3/1994    McConkey ........ B23Q 11/1038
                                                        184/6.24
2015/0054291 A1 *    2/2015    Stahlkopf ................. F02C 6/16
                                                        290/1 R
(Continued)

FOREIGN PATENT DOCUMENTS

JP        50-069213        6/1975
JP        S50-69213        6/1975
(Continued)

OTHER PUBLICATIONS

Translation JP63072833 (Year: 2022).*
(Continued)

*Primary Examiner* — Nathaniel E Wiehe
*Assistant Examiner* — Frederick F Calvetti
(74) *Attorney, Agent, or Firm* — GREENBLUM & BERNSTEIN, P.L.C.

(57) ABSTRACT

A method of supplying cooling water to a laser processing head includes arranging a cooling water supply path connected to the laser processing head, connecting, to the cooling water supply path, a water supply path for supplying water and an antirust supply path for supplying antirust, keeping constant a ratio between a water quantity fed by a water feed means connected to the water supply path and an antirust quantity fed by an antirust feed means connected to the antirust supply path, mixing the water and antirust in the cooling water supply path, and supplying cooling water to the laser processing head.

16 Claims, 10 Drawing Sheets

(51) Int. Cl.
  *B23K 26/70* (2014.01)
  *B23K 37/00* (2006.01)
  *B23Q 11/10* (2006.01)

(58) Field of Classification Search
  USPC .................................................. 219/121.84
  See application file for complete search history.

(56) References Cited

U.S. PATENT DOCUMENTS

| | | | | |
|---|---|---|---|---|
| 2016/0120058 | A1* | 4/2016 | Shedd | H05K 7/20327 |
| | | | | 165/244 |
| 2017/0279244 | A1* | 9/2017 | Kasahara | H01S 3/1317 |
| 2017/0294755 | A1* | 10/2017 | Takigawa | H01S 3/0014 |
| 2018/0250775 | A1* | 9/2018 | Spink | B22F 10/20 |

FOREIGN PATENT DOCUMENTS

| | | |
|---|---|---|
| JP | 57-094697 | 6/1982 |
| JP | 63-072833 | 4/1988 |
| JP | H05-98477 | 4/1993 |
| JP | 05-172988 | 7/1993 |
| JP | 08-141768 | 6/1996 |
| JP | 10-305387 | 11/1998 |
| JP | H11-314187 | 11/1999 |
| JP | 2000-220800 | 8/2000 |
| JP | 3291097 | 6/2002 |
| JP | 2006-096051 | 4/2006 |
| JP | 2007-278608 | 10/2007 |
| JP | 2012-091265 | 5/2012 |
| JP | 2013-215743 | 10/2013 |
| WO | 2015/162110 | 10/2015 |

OTHER PUBLICATIONS

DE102020007211 (Year: 2023).*
Translation of JP S50-69213 (Year; 2020).
Translation of JP 2000-220800 (Year; 2020).
Translation of JP S57-94697 (Year; 2020).
Translation of JP S57-156132 (Year; 2020).
Translation of JP H10-305387 (Year; 2020).
Translation of JP 2013-215743 (Year; 2020).
Translation of JP 321097 (Year; 2020).
Translation of JP S57-094692 (Year; 2020).
Translation of WO 2015/162110 (Year; 2020).
Office Action (Decision to Grant a Patent) issued in Japan Counterpart Patent Appl. No. 2017-137971, dated Feb. 1, 2019.
Office Action (Reason for Refusal) issued in Japan Counterpart Patent Appl. No. 2017-137971, dated Dec. 8, 2017.
Office Action (Reason for Refusal) issued in Japan Counterpart Patent Appl. No. 2017-137971, dated Jul. 19, 2018.
Official Communication issued in International Bureau of WIPO Patent Application No. PCT/JP2017/035291, dated Dec. 19, 2017.
English language translation of allowed claims in Japan Counterpart Patent Appl. No. 2017-137971.
Official Communication issued in European Patent Office (EPO) Patent Application No. 17865531.2, dated Sep. 25, 2019.

* cited by examiner

METHOD OF AND APPARATUS FOR SUPPLYING COOLING WATER TO LASER PROCESSING HEAD AND METHOD OF PRODUCING COOLING WATER

CROSS-REFERENCE TO RELATED APPLICATIONS

This is a continuation application of U.S. patent application Ser. No. 16/344,598, filed on Apr. 24, 2019, which is a National Phase Application of International Application No. PCT/JP2017/035291, filed on Sep. 28, 2017, which claims the benefit of Japanese Patent Application Nos. 2017-137971, filed on Jul. 14, 2017, and 2016-210446, filed Oct. 27, 2016. The entire disclosure of each of the above-identified applications, including the specification, drawings, and claims, is incorporated herein by reference in its entirety.

TECHNICAL FIELD

The present invention related to a method of and an apparatus for supplying cooling water to a laser processing head of a laser processing apparatus and a method of producing cooling water.

BACKGROUND ART

When laser-processing a workpiece such as a metal plate, the workpiece is cooled by supplying cooling water to the vicinity of a laser processing spot (refer to, for example, Patent Literatures 1, 2, and 3).

PRIOR ART DOCUMENT

Patent Literature

Patent Literature 1: Japanese Unexamined Patent Application Publication No. H10-305387
Patent Literature 3: Japanese Unexamined Patent Application Publication No. 2006-96051

SUMMARY OF THE INVENTION

Conventionally, when supplying cooling water to the vicinity of a laser processing spot of a workpiece, the cooling water is adjusted to have a specified concentration by mixing water (pure water, purified water) with antirust and is used. At this time, the quantities of the water and antirust are adjusted and are poured into a proper container. In the container, the water and antirust are stirred and mixed to prepare cooling water with a specified antirust concentration. The cooling water produced as mentioned above is stored in, for example, a storage tank.

Namely, in the past, a worker measures water and antirust, puts them in a proper container, and stirs and mixes them. Accordingly, there is a problem that an antirust concentration of the cooling water easily involves an individual difference. Also, the water and antirust are stirred and mixed in a container and poured into a storage tank, to raise various problems such as troublesome work and easily spilling the cooling water.

Means to Solve the Problems

In consideration of the above-mentioned situations, an object of the present invention is to provide a method of and an apparatus for mixing water and antirust always at a fixed ratio and automatically producing and supplying cooling water with a stabilized antirust concentration, and a method of producing cooling water.

According to an aspect of the present invention, the method of supplying cooling water to a laser processing head comprises; providing a cooling water supply path connected to the laser processing head, connecting, to the cooling water supply path, a water supply path for supplying water and an antirust supply path for supplying antirust, keeping constant a ratio between a water quantity fed by a water feed means connected to the water supply path and an antirust quantity fed by an antirust feed means connected to the antirust supply path, mixing the water and antirust in the cooling water supply path, and supplying cooling water to the laser processing head.

Preferably, in the above-mentioned method of supplying cooling water, a cooling water tank for storing cooling water is provided in the cooling water supply path and the water and antirust are mixed in the cooling water tank.

Also preferably, in the above-mentioned method of supplying cooling water, a cooling water tank is provided in the cooling water supply path for storing cooling water and the water supply path for supplying water and the antirust supply path for supplying antirust are connected to a mixed solution supply path connected to the cooling water tank, and water fed by the water feed means connected to the water supply path and antirust fed by the antirust feed means connected to the antirust supply means are mixed in the mixed solution supply path and the mixed cooling water is stored in the cooling water tank.

According to another aspect of the present invention, the method of supplying cooling water to a laser processing head comprises; providing, in a cooling water supply path connected to the laser processing head, a cooling water tank for storing cooling water, connecting, to the cooling water tank, a water supply path for supplying water and an antirust supply path for supplying antirust, mixing, in the cooling water tank, water fed by a water feed means connected to the water supply path and antirust fed by an antirust feed means connected to the antirust feed path, adjusting a water feed quantity and/or an antirust feed quantity so that a cooling water conductivity in the cooling water tank comes within a preset range, maintaining the cooling water conductivity within the preset range, and supplying the cooling water to the laser processing head.

According to another aspect of the present invention, the method of producing laser processing cooling water comprises; connecting, to a cooling water tank for storing cooling water that is a mixture of water and antirust, a water supply path for supplying the water and an antirust supply path for supplying the antirust, substantially keeping constant a ratio between a water quantity supplied from the water supply path and an antirust quantity supplied from the antirust supply path, and mixing and storing the water and antirust in the cooling water tank.

According to another aspect of the present invention, the method of producing laser processing cooling water comprises; connecting a mixed water supply path to a cooling water tank for storing cooling water that is a mixture of water and antirust, connecting, to the mixed water supply path, a water supply path for supplying the water and an antirust supply path for supplying the antirust, substantially keeping constant a ratio between a water quantity supplied from the water supply path and an antirust quantity supplied from the antirust supply path, mixing the water and antirust in the mixed water supply path, and storing the mixed cooling water in the cooling water tank.

Preferably, in the above-mentioned method of producing laser processing cooling water, pure water purified from tap water through a pure water unit is employed as the water.

Also preferably, in the above-mentioned method of producing laser processing cooling water, supplying the water and antirust supplied to the cooling water tank is achieved by keeping constant a ratio between a water quantity and an antirust quantity during a period from a stored water quantity detection means provided for the cooling water tank detects a preset decrease until the water quantity detection means detects a preset increase, or until a preset time elapses, or until a flow rate meter provided for the water supply path and a flow rate meter provided for the antirust supply path detect preset flow rates.

Also preferably, in the above-mentioned method of producing laser processing cooling water, the water and antirust supplied to the cooling water tank is achieved by measuring, with a water meter, a cooling water quantity supplied from the cooling water tank to the laser processing head and after the measured value reaches a preset quantity.

According to another aspect of the present invention, the method of producing laser processing cooling water comprises; providing a cooling water tank for storing cooling water that is a mixture of water and antirust, connecting, to the cooling water tank, a water supply path for supplying water and an antirust supply path for supplying the antirust, mixing the water supplied from the water supply path and the antirust supplied from the antirust supply path to produce the cooling water, measuring a cooling water conductivity in the cooling water tank, and adjusting a supply quantity of the water and/or of the antirust to maintain the conductivity within a preset range.

According to another aspect of the present invention, the apparatus for supplying cooling water to a laser processing head comprises; a cooling water supply path connected to a laser processing head, a water supply path for supplying water and an antirust supply path for supplying antirust both connected to the cooling water supply path, a water feed means connected to the water supply path, and an antirust feed means connected to the antirust supply path, wherein a ratio between a water feed quantity by the water feed means and an antirust feed quantity by the antirust feed means is substantially kept constant.

Preferably, in the above-mentioned apparatus for supplying cooling water, the cooling water supply path is provided with a cooling water tank for storing cooling water.

Also preferably, in the above-mentioned apparatus for supplying cooling water, the water supply path is provided with a pure water unit for conducting a water purifying process and is connected to waterworks.

Also preferably, in the above-mentioned apparatus for supplying cooling water, the water feed means and antirust feed means each are a metering pump or a metering valve.

Also preferably, in the above-mentioned apparatus for supplying cooling water, the metering pump is a pump whose power source is air pressure.

According to another aspect of the present invention, the method of supplying cooling water to a cooling water tank that stores cooling water supplied to a laser processing head comprises; (a) a step of opening the cooling water tank to atmospheric pressure when supplying cooling water, which is water and antirust, or a mixed liquid of water and antirust, to the cooling water tank, (b) a step of driving a metering pump connected to a water storage tank, to supply water to the cooling water tank, (c) a step of returning the pressure in the cooling water tank to an original pressure when a fluid sensor arranged on a downstream side of the metering pump detects a water flow, and (d) a step of driving an antirust supply pump to supply the antirust toward the cooling water tank side.

Also, the above-mentioned method of supplying cooling water, further comprises; a step of temporarily stopping the metering pump when the fluid sensor arranged on the downstream side of the metering pump detects a water flow, and a step of again driving the metering pump when a fluid sensor arranged on a downstream side of the antirust pump detects an antirust flow.

According to another aspect of the present invention, the apparatus for supplying cooling water to a laser processing head comprises; a cooling water tank that stores cooling water supplied to the laser processing head, a water supply path provided with a metering pump to supply water to the cooling water tank, and an antirust supply path provided with a pump to supply antirust toward the cooling water tank side, wherein the water supply path is provided with a fluid sensor for detecting a water flow.

In the above-mentioned apparatus for supplying cooling water, the antirust supply path is provided with a fluid sensor for detecting an antirust flow.

Also in the above-mentioned apparatus for supplying cooling water, a cooling water supply path that connects the cooling water tank to the laser processing head is provided with a changeover valve that optionally opens and closes the cooling water supply path and is able to discharge cooling water from the cooling water tank.

Also in the above-mentioned apparatus for supplying cooling water, the cooling water supply path is provided with a conductivity meter for detecting a cooling water conductivity.

According to another aspect of the present invention, the method of supplying cooling water to a cooling water tank that stores cooling water supplied to a laser processing head comprises; (a) a step of supplying cooling water, which is water and antirust, or a mixed liquid of water and antirust, to the cooling water tank, (b) a step of opening the cooling water tank to atmospheric pressure when a supply pressure of at least one of the water and antirust to the cooling water tank decreases, (c) a step of driving a metering pump connected to a water storage tank to supply water to the cooling water tank, (d) a step of returning the pressure in the cooling water tank to an original pressure when a fluid sensor arranged on a downstream side of the metering pump detects a water flow, and (e) a step of driving an antirust supply pump to supply the antirust toward the cooling water tank side.

DESCRIPTION OF EMBODIMENTS

Hereunder, embodiments according to the present invention will be explained with reference to the drawings.

Figure 1:
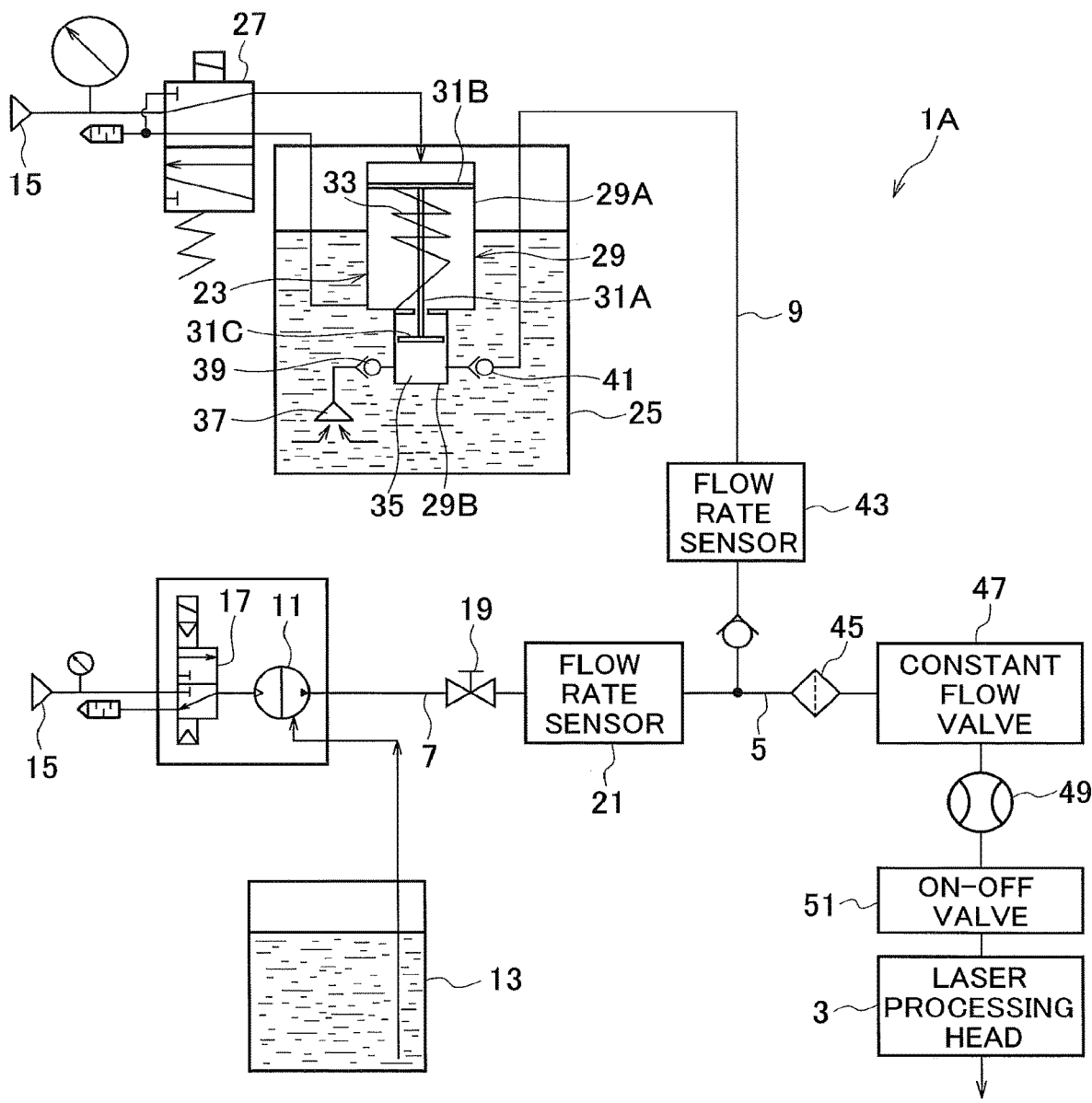
FIG. 1 is an explanatory schematic diagram roughly showing a cooling water supply apparatus according to a first embodiment of the present invention.

FIG. 1 is an explanatory schematic diagram roughly showing a cooling water supply apparatus according to the first embodiment of the present invention.

As schematically and roughly shown in FIG. 1, the cooling water supply apparatus 1A according to the first embodiment has a cooling water supply path 5 connected to a laser processing head 3 provided for a laser processing apparatus (not shown). To the cooling water supply path 5, there are connected a water supply path 7 to supply water and an antirust supply path 9 to supply antirust.

The water supply path 7 is provided with a metering pump 11. The metering pump 11 forms a water feed means to draw water (pure water, purified water) from a water storage tank 13 and feed it to the cooling water supply path 5. The metering pump (water feed means) 11 is a pump whose drive source is air pressure supplied from an air source 15. Repeating open and close operations of an electromagnetic on-off valve 17 arranged in an air circuit provides the metering pump 11 with a function of repeating the operations of drawing water from the water storage tank 13 and feeding it to the cooling water supply path 5.

The metering pump 11 is constituted with, for example, a diaphragm-type pump. Accordingly, adjusting the speed of the open and close operations (ON and OFF operations of a solenoid) per unit time of the electromagnetic on-off valve 17 results in adjusting a water feed quantity per unit time of the metering pump 11. The water supply path 7 is provided with a throttle valve 19 such as a needle valve to optionally adjust a water feed quantity and a flow rate sensor 21 to detect a water flow. The flow rate sensor 21 is sufficient if it can detect a water flow in the water supply path 7 and forms a kind of fluid sensor.

Accordingly, a water feed quantity from the water supply path 7 to the cooling water supply path 5, i.e., a water feed quantity per unit time can be adjusted with the throttle valve 19. The flow rate sensor (fluid sensor) 21 is able to detect that there is no water in the water storage tank 13, and according to the detected result, water may newly be supplied to the water storage tank 13.

By the way, it is also possible to detect a water quantity in the water storage tank 13 by arranging a proper stored water quantity detection means (not shown) such as a float switch. It is also possible to configure that, when the water storage quantity detection means detects that water in the water storage tank 13 has decreased to a preset value, water is supplied to the water storage tank 13. In this case, it is possible to configure to supply water manually or automatically by driving a refill pump.

The antirust supply path 9 is provided with a metering pump 23 as an example of an antirust feed means to feed antirust. The metering pump (antirust feed means) 23 acts to draw antirust from an antirust tank 25 and feed it to the antirust supply path 9. Repeating open and close operations of an electromagnetic on-off valve 27 arranged in an air circuit provides the metering pump 23 with a function of repeating the operations of drawing the antirust from the antirust tank 25 and feeding it to the antirust supply path 9. The metering pump 23 according to the embodiment is constituted as mentioned below.

Namely, the metering pump 23 has a cylinder main body 29 constituted by connecting a large-diameter cylinder 29A to a small-diameter cylinder 29B. Through the large-diameter cylinder 29A and small-diameter cylinder 29B, there is arranged a piston rod 31A whose one end is integrally provided with a large-diameter piston 31B that is fitted into and is able to freely reciprocate in the large-diameter cylinder 29A. The other end of the piston rod 31A in the small-diameter cylinder 29B is integrally provided with a small-diameter piston 31C that is fitted into and is able to freely slide in the small-diameter cylinder 29B.

To reciprocate the piston rod 31A and large- and small-diameter pistons 31B and 31C, a return spring 33 is resiliently arranged between the large-diameter piston 31B and the bottom of the large-diameter cylinder 29. A lower part of the small-diameter cylinder 29B is formed as a piston pump chamber 35. Namely, the piston pump chamber 35 is connected to a filter 37 immersed in the antirust and a check valve 39 that allows the antirust to flow into the piston pump chamber 35. The piston pump chamber 35 is also connected through a check valve 41, which prevents a reverse flow to the piston pump chamber 35, to the antirust supply path 9. In the antirust supply path 9, there is arranged a flow rate sensor 43 that is similar to the flow rate sensor 21.

With the above-mentioned configuration, the electromagnetic on-off valve 27 is repeatedly turned ON and OFF to reciprocate the large and small pistons 31B and 31C of the metering pump 23. As a result, the operations of drawing the antirust from the antirust tank 25 into the piston pump chamber 35 and discharging (feeding) it to the antirust supply path 9 are repeated. Accordingly, adjusting the speed of open and close operations of the electromagnetic on-off valve 27 results in adjusting a feed quantity per unit time of the antirust from the metering pump 23. If the antirust in the antirust tank 25 runs out, the flow rate sensor 43 detects it.

By the way, it is also possible to detect the residual quantity of the antirust in the antirust tank 25 with a proper residual quantity detection means such as a float switch. It is also possible to configure such that, when an antirust residual quantity in the antirust tank 25 is detected to be small, the antirust is refilled manually or automatically with the use of a refill pump.

The water supplied through the water supply path 7 and the antirust supplied through the antirust supply path 9 are supplied to the cooling water supply path 5 and merged therein. In the cooling water supply path 5, they are stirred and mixed and supplied to the laser processing head 3. Accordingly, the cooling water supply path 5 acts to supply a solution of the mixed water and antirust to the laser processing head 3. The cooling water supply path 5, therefore, can be called as a mixed solution supply path.

It is preferable that a ratio between a water quantity supplied from the water supply path 7 and an antirust quantity supplied from the antirust supply path 9 is always constant. Namely, it is preferable to always keep nearly constant the concentration and conductivity of the mixed cooling water.

On the downstream side of a junction of the water supply path 7 and antirust supply path 9, the cooling water supply path 5 has a filter 45. On the downstream side of the filter 45, there is a constant flow valve 47, and on the downstream side of the valve 47, there is a flow rate meter 49. Further, on the downstream side of the flow rate meter 49, there is an electromagnetic on-off valve 51 to supply and stop the cooling water to the laser processing head 3.

By the way, the cooling water supplied to the laser processing head 3 is a fluid made by mixing and stirring water and antirust and a concentration of the antirust is about 2%. Accordingly, a ratio between a water quantity supplied from the water supply path 7 and an antirust flow rate supplied from the antirust supply path 9 is about 49:1. Namely, with respect to a water quantity supplied from the water supply path 7, an antirust quantity supplied from the antirust supply path 9 is small and is about 1/50. Accordingly, a feed capacity of the metering pump 23 serving as the antirust feed means can be smaller than a water supply capacity of the metering pump 11 serving as the water feed means, to realize a compact and simple configuration.

As is apparent from the above-mentioned configuration, the cooling water fed to the laser processing head 3 per unit time is kept at a preset flow rate by the constant flow valve 47. As a result, a stable flow rate is always secured. Also, the flow rate meter 49 is able to measure a cooling water quantity (flow rate) fed to the laser processing head 3. Namely, it is possible to measure a cooling water quantity per unit time and a cumulative water quantity.

In the above-mentioned configuration, if the flow rate sensors 21 and 43 detect that the water in the water storage tank 13 runs out and the antirust in the antirust tank 25 runs out, the water storage tank 13 is replenished with water and the antirust tank 25 is replenished with antirust.

By the way, the flow rate meter 49 enables to know a cooling water supply quantity to the laser processing head 3. Accordingly, an initial water quantity stored in the water storage tank 13 and an initial antirust quantity stored in the antirust tank 25 are obtained beforehand, and according to a cooling water flow rate measured by the flow rate meter 49, it is possible to compute a residual water quantity in the water storage tank 13 and a residual antirust quantity in the antirust tank 25.

In other words, it is possible to estimate, according to a measurement by the flow rate meter 49, a residual water quantity in the water storage tank 13 and a residual antirust quantity in the antirust tank 25. Accordingly, when a measurement by the flow rate meter 49 reaches a value in a preset range, water and antirust can be poured. At this time, the water and antirust are poured for their consumed quantities.

As is already understood, the above-mentioned configuration is able to resupply water when a residual water quantity in the water storage tank 13 decreases and to resupply the antirust when a residual antirust quantity in the antirust tank 25 decreases. As a result, the cooling water can continuously be supplied to the laser processing head 3.

When producing the cooling water, a water quantity fed by the metering pump 11 and an antirust quantity fed by the metering pump 23 are mixed.

Accordingly, the water and antirust feed quantities can be kept at a fixed ratio when mixed. Namely, the cooling water produced by mixing the water and antirust can always maintain a substantially constant antirust concentration. At this time, it is possible to automatically drive the metering pumps 11 and 23, to automatically produce the cooling water. Namely, it is possible to produce cooling water having a substantially fixed antirust concentration.

By the way, in the above explanation, the water supplied from the water supply path 7 and the antirust supplied from the antirust supply path 9 are mixed in the cooling water supply path 5. It is also possible to arrange a mixing tank (not shown) as a part of the cooling water supply path 5 at a junction of the water supply path 7 and antirust supply path 9, and in the mixing tank, mix the water and antirust. In this case, it is configured to supply (feed) cooling water from the mixing tank to the cooling water supply path 5.

Figure 2:
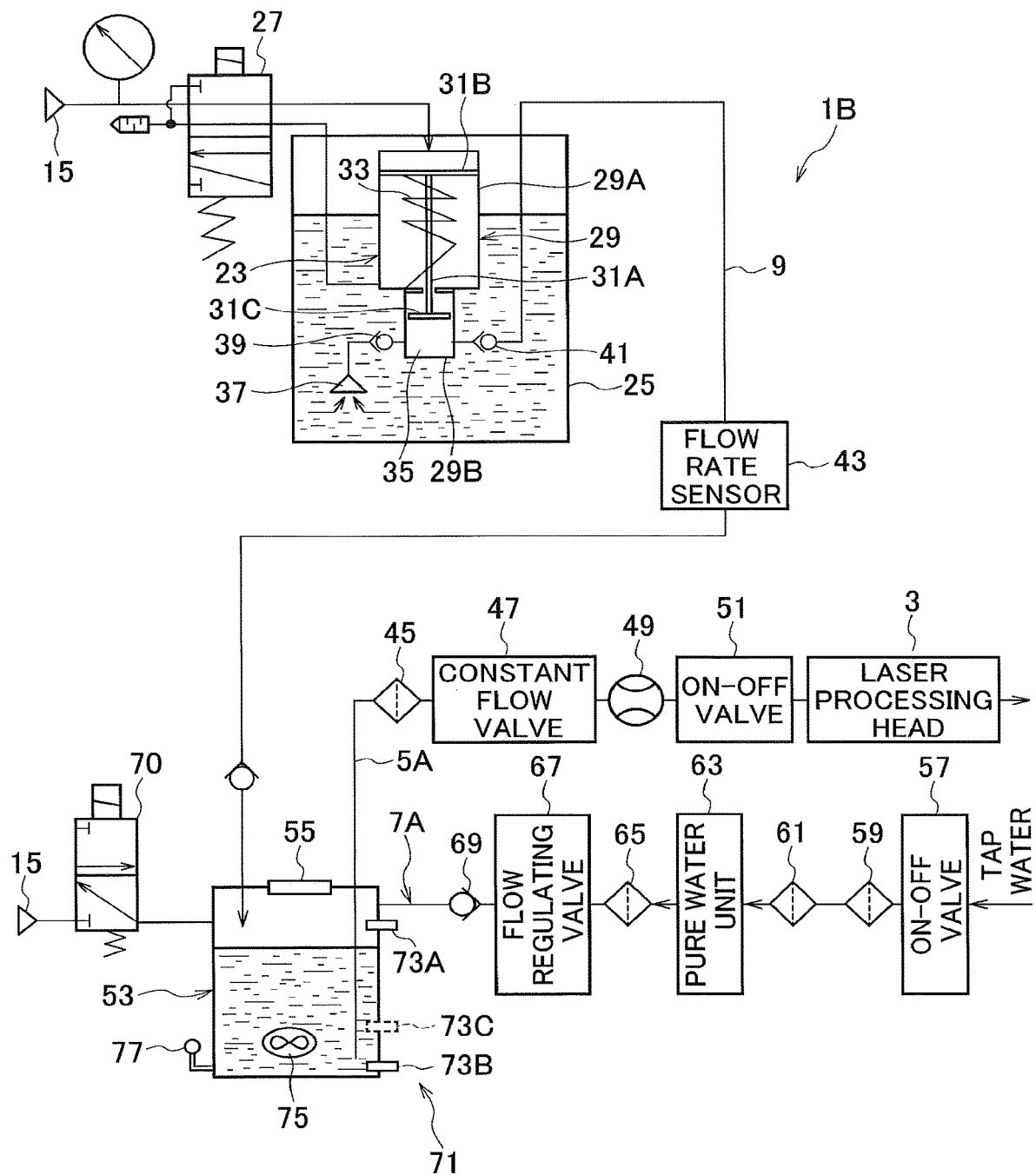
FIG. 2 is an explanatory schematic diagram roughly showing a cooling water supply apparatus according to a second embodiment of the present invention.

FIG. 2 schematically and roughly shows a cooling water supply apparatus 1B according to the second embodiment of the present invention. In the configuration of the second embodiment, components having the same functions as those of the embodiment shown in FIG. 1 are represented with the same reference numerals to omit overlapping explanations.

In the first embodiment shown in FIG. 1, it has been explained that water (pure water, purified water) is stored in the water storage tank 13, and in the cooling water supply path 5 to supply cooling water to the laser processing head 3, water and antirust are mixed. According to the second embodiment, it is configured that a water tank 53 is arranged as a part of the cooling water supply path 5, and in the cooling water tank 53, water and antirust are mixed. Accordingly, the cooling water tank 53 can be called as a mixing tank. In addition, the cooling water tank 53 provides a function of storing cooling water, and therefore, it can be called as a cooling water storage tank. In the cooling water supply path 5, a cooling water supply path from the cooling water tank 53 to the laser processing head 3 is indicated with a reference numeral 5A.

More precisely, the cooling water tank 53 is constituted to have a lid member 55 that can be opened and closed and is closed in a usual state. A water supply path 7A to supply water to the cooling water tank 53 is a water supply path to supply tap water and is connected through an on-off valve 57 such as an electromagnetic valve to waterworks.

The water supply path 7A is provided with a plurality of filters such as an iron rust removing filter 59 and a chlorine removing filter 61.

Further, the water supply path 7A is provided with a pure water unit 63 that uses, for example, ion-exchange resin.

Accordingly, the tap water is deionized by the pure water unit 63 and is supplied to the cooling water tank 53. Further, the water supply path 7A is provided with a filter 65 to remove fine particles and a flow regulating valve 67 and is connected through a backflow check valve 69 to the cooling water tank 53.

In the above-mentioned configuration, the flow regulating valve 67 is controlled to adjust a water supply quantity per unit time to the cooling water tank 53. As a result, it is possible to always keep constant a ratio between an antirust supply quantity fed to the cooling water tank 53 by the metering pump 23 and a water quantity fed from the water supply path 7A to the cooling water tank 53. As a result, when supplying cooling water produced by mixing the water and antirust in the cooling water tank 53 to the laser processing head 3, it is possible to maintain and supply a substantially fixed antirust concentration. Namely, the mixed cooling water can always maintain a substantially fixed conductivity.

To the cooling water tank 53, there is connected an air circuit connected to the air source 15, to apply an air pressure to the cooling water tank 53. The air circuit is provided with an on-off valve 70 such as an electromagnetic valve. Accordingly, when turning ON a solenoid of the on-off valve 70, the air pressure is applied from the air source whose air pressure is adjusted to a fixed value in advance to the cooling water tank 53. When turning OFF the solenoid of the on-off valve 70, the on-off valve 70 opens to set the air pressure in the cooling water tank 53 to atmospheric pressure. Namely, the preliminary adjusted air pressure can maintain the cooling water tank 53 at a fixed pressure that is higher than atmospheric pressure.

As is already understood, keeping the solenoid of the on-off valve 70 at an ON state always applies the substantially fixed air pressure to the cooling water tank 53. Accordingly, turning ON (opening) the on-off valve 51 provided for the cooling water supply path 5A results in feeding the cooling water from the cooling water tank 53 to the cooling water supply path 5A due to the internal pressure. At this time, even if the pressure in the cooling water tank 53 changes, the constant flow valve 47 acts to keep constant a cooling water supply quantity per unit time to the laser processing head 3, thereby securing a stable flow rate. A water quantity passing through the cooling water supply path 5A is measured by the flow rate meter 49. Accordingly, the cooling of a laser processing spot at the time of laser processing is achieved in a stable state with a preset fixed cooling water quantity per unit time.

As mentioned above, when the cooling water in the cooling water tank 53 is fed to the cooling water supply path 5A, the cooling water in the cooling water tank 53 gradually decreases. Accordingly, the cooling water tank 53 is provided with a water quantity detection means 71 to detect a cooling water quantity. The water quantity detection means 71 may be constituted with, for example, the above-mentioned float switch.

The water quantity detection means 71 according to this embodiment is configured to detect a water surface in the cooling water tank 53.

The configuration of the water quantity detection means 71 according to the embodiment will be explained as a case of employing, for the sake of easy understanding, an upper limit sensor 73A to detect a water surface upper limit and a lower limit sensor 73B to detect a water surface lower limit. The water quantity detection means 71 is sufficient if it has a function of detecting a water quantity (water level) in the cooling water tank 53. Accordingly, the water quantity detection means 71 may employ a various kinds of configurations.

With the above-mentioned configuration, when the cooling water in the cooling water tank 53 decreases and the lower limit sensor 73B detects a water surface, the on-off valve 70 is opened to keep atmospheric pressure in the cooling water tank 53. As a result, the cooling water supply to the laser processing head 3 is stopped. When the inside of the cooling water tank 53 becomes atmospheric pressure, the on-off valve 57 in the water supply path 7A is opened to supply water to the cooling water tank 53. Also, the metering pump 23 is activated to supply the antirust.

At this time, the adjustment of a water supply quantity is carried out with the flow regulating valve 67 and the adjustment of an antirust supply quantity with the metering pump 23. A ratio between the water supply quantity and the antirust supply quantity into the cooling water tank 53 is always maintained substantially at a fixed value. Accordingly, when the water and antirust are mixed in the cooling water tank 53, an antirust concentration is always maintained at an allowable set value.

In other words, a cooling water conductivity is always maintained substantially at a fixed value.

When the water and antirust are supplied to the cooling water tank 53 as mentioned above, a water surface in the cooling water tank 53 gradually increases. When the upper limit sensor 73A detects the water surface, the supply of water and antirust to the cooling water tank 53 is stopped. Then, the on-off valve 70 is turned ON to apply the preset air pressure to the cooling water tank 53. As a result, the initial state that is able to supply cooling water to the laser processing head 3 resumes.

By the way, as mentioned above, when the water and antirust are supplied (poured) to the cooling water tank 53, the supply of cooling water to the laser processing head 3 is stopped. For this, a configuration is made to detect a water surface at an intermediate level between the upper limit sensor 73A and the lower limit sensor 73B. Namely, at the intermediate level between the upper limit sensor 73A and the lower limit sensor 73B, there is arranged, for example, an intermediate sensor 73C.

After the intermediate sensor 73C detects a water surface, it is possible to configure that, when laser processing by the laser processing apparatus is suspended, or when laser processing that requires no cooling water is carried out, the cooling water tank 53 is replenished with water and antirust. According to this configuration, the cooling water is produced when, for example, a workpiece is set on or removed from the laser processing apparatus. Accordingly, even when a plurality of workpieces are repeatedly laser-processed, the cooling water tank 53 can be compact.

By the way, as mentioned above, it is configured to mix water and antirust in the cooling water tank 53, and therefore, it is preferable to arrange a stirring blade 75 rotated by a motor (not shown). Arranging the stirring blade 75 in the cooling water tank 53 in such away results in efficiently mixing and stirring the water and antirust. Even if the water and antirust tend to separate from each other in the cooling water tank 53, the configuration is able to prevent the separation of the water and antirust.

By the way, in the above explanation, when the lower limit sensor 73B of the water quantity detection means 71 detects a water surface in the cooling water tank 53, water and antirust are supplied (poured) into the cooling water tank 53. Instead, the water quantity detection means 71 may be configured to detect the position of a water surface in the cooling water tank 53, for example, the position (water surface level) of a float floating on the water surface.

As mentioned above, configuring the water quantity detection means 71 to detect a water surface level makes it possible to always detect a water quantity in the cooling water tank 53. Accordingly, it is possible to configure that, when the cooling water in the cooling water tank 53 is detected to decrease to a preset water surface level, the water and antirust are started to be supplied to the cooling water tank 53.

In this case, stopping the supply of water and antirust is carried out when the water quantity detection means 71 detects a preset increase, i.e., a preset water surface level, or when a preset time has passed after starting the supply of water and antirust.

Also, the cooling water supply path 5A is provided with the flow rate meter 49, and therefore, it is possible to configure that, when a measured value by the flow rate meter 49 reaches a preset value, i.e., when it is detected that the cooling water tank 53 has supplied a preset quantity of cooling water, the supply (replenish) of water and antirust to the cooling water tank 53 is started.

By the way, when the laser processing apparatus conducts laser processing, a gap between a nozzle of the laser processing head and a workpiece is always kept constant. The gap is controlled to a fixed value by a capacitance-type copying sensor system provided for the laser processing head. Here, if a cooling water conductivity deviates from a preset range, operation of the capacitance-type copying sensor system may be destabilized.

In the above explanation, water and antirust are supplied at a fixed ratio to the cooling water tank 53 and mixed. Generally, a cooling water conductivity and an antirust concentration have a proportional relationship, and therefore, there will be no problem if the antirust concentration is maintained in an allowable range. Accordingly, when producing cooling water by mixing water and antirust, it is possible to measure a cooling water conductivity and adjust (control) the quantities of the water and antirust supplied to produce the cooling water.

For this, the cooling water tank 53 is configured to have a conductivity meter 77. If a measured value by the conductivity meter 77 is smaller than a preset allowable value, the antirust is fed by the metering pump 23. If the conductivity is greater than the allowable value, the cooling water tank 53 is replenished with water. Namely, the quantities of the water and antirust supplied to the cooling water tank 53 are separately adjusted (controlled) to adjust the cooling water conductivity within the allowable range.

As mentioned above, maintaining the cooling water conductivity within the preset conductivity range can always maintain the operation of the capacitance-type copying sensor system provided for the laser processing head in a stable state and always conduct proper laser processing.

Figure 3:
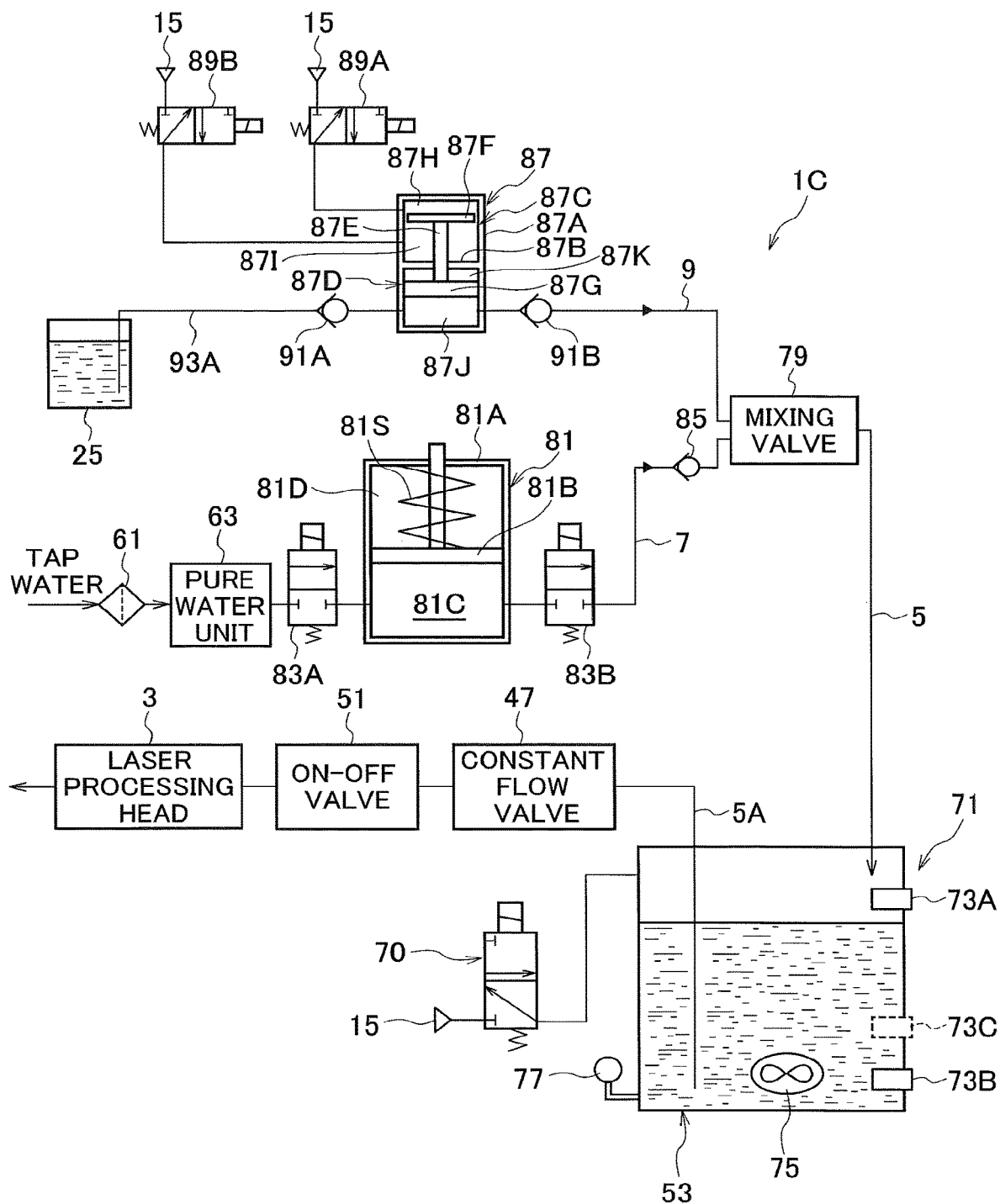
FIG. 3 is an explanatory schematic diagram roughly showing a cooling water supply apparatus according to a third embodiment of the present invention.

FIG. 3 schematically and roughly shows a configuration of a cooling water supply apparatus 10 according to the third embodiment of the present invention. In this configuration, components having the same functions as those of the above-mentioned embodiments are represented with the same reference numerals to omit overlapping explanations.

In connection with the configuration of the second embodiment shown in FIG. 2, it has been explained that water and antirust are mixed in the cooling water tank 53. According to the configuration of the third embodiment, the water and antirust are mixed in a cooling water supply path 5 that supplies the water and antirust to a cooling water tank 53.

Namely, the cooling water supply path 5 is provided with a mixing valve 79 to mix water and antirust. To the mixing valve 79, a water supply path 7 for supplying water and an antirust supply path 9 for supplying antirust are connected. The water supply path 7 carries out a purifying process on tap water and supplies the purified water. The water supply path 7 is provided with a filter 61 and a pure water unit 63. Further, the water supply path 7 is provided with a metering pump 81 as an example of a water feed means.

The metering pump 81 according to this embodiment is constituted with a cylinder 81A. In the cylinder 81A, a piston 81B is inserted to freely reciprocate. In the cylinder 81A, the piston 81B defines a pump chamber 81C and a spring chamber 81D in which a return spring 81S is resiliently arranged. The spring chamber 81D is open to atmospheric pressure.

Between an inflow side of the pump chamber 81C of the metering pump 81 and the pure water unit 63, an on-off valve 83A is arranged. Between an outflow side of the pump chamber 81C and the mixing valve 79, an on-off valve 83B and a backflow check valve 85 are arranged.

Accordingly, when the on-off valve 83B is maintained in a closed state and the on-off valve 83A is opened, tap water purified by the pure water unit 63 flows into the pump chamber 81C of the metering pump 81. At this time, the piston 81B slides (ascends) due to water pressure against the pressing force of the spring 81S. A stroke of the piston 81B is kept constant, and therefore, the piston 81B stops at a stroke end. Thereafter, the on-off valve 83A is closed and the on-off valve 83B is opened so that water in the pump chamber 81C of the metering pump 81 is fed, due to the pressing force of the spring 81S, from the pump chamber 81C to the mixing valve 79.

As is already understood, repeatedly alternating the ON and OFF operations of the on-off valves 83A and 83B at proper intervals results in reciprocating the piston 81B of the metering pump 81. In other words, it is possible to adjust a water quantity per unit time fed from the metering pump 81.

The antirust supply path 9 is provided with a metering pump 87 as an example of an antirust feed means. The metering pump 87 is configured similar to the metering pump 23 mentioned before and is provided with a cylinder 87A. The cylinder 87A incorporates a partition wall 87B to define an air action chamber 87C and a pump action chamber 87D. A piston rod 87E passes through the partition wall 87B and an end thereof in the air action chamber 87C is provided with a piston 87F. An end thereof in the pump action chamber 87D is provided with a piston 87G.

The air action chamber 87C is divided by the piston 87F into a first chamber 87H and a second chamber 87I. The first chamber 87H is connected through an on-off valve 89A to an air source 15. The second chamber 87I is connected through an on-off valve 89B to the air source 15. Accordingly, when the on-off valves 89A and 89B are alternately opened and closed, the supplying air pressure to the first chamber 87H and discharging air from the second chamber 87I and the supplying air pressure to the second chamber 87I and discharging air from the first chamber 87H alternate. Namely, the piston rod 87E reciprocates.

The pump action chamber 87D is divided by the piston 87G into a pump chamber 87J and an open chamber 87K opened to atmospheric pressure. An inlet side of the pump chamber 87J is connected through a check valve 91A to an inflow path 93A connected to an antirust tank 25. An outlet side of the pump chamber 87J is connected through a check valve 91B to the mixing valve 79.

Accordingly, as mentioned above, when the on-off valves 89A and 89B are opened and closed to reciprocate (move up and down) the piston rod 87E, the piston 87G together moves up and down. At this time, when the piston 87G ascends, antirust is drawn from the antirust tank 25 into the pump chamber 87J. When the piston 87G descends, the antirust is fed from the pump chamber 87J to the mixing valve 79 through the antirust supply path 9.

Here, a stroke of the piston 87G in the metering pump 87 is kept constant, and therefore, an antirust quantity fed by one reciprocation of the piston 87G is limited to a fixed value. It is possible to adjust the number of strokes of the piston 87G, to adjust an antirust feed quantity from the metering pump 87.

The antirust fed from the metering pump 87 and the water fed from the metering pump 81 are mixed in the mixing valve 79, and thereafter, are stored in the cooling water tank 53. A ratio between a water feed quantity from the metering pump 81 and an antirust feed quantity from the metering pump 87 is preset so that the conductivity and concentration of cooling water are substantially kept constant. Accordingly, the conductivity and concentration of the cooling water flowing from the cooling water supply path 5 into the cooling water tank 53 are always kept substantially constant.

By the way, if a conductivity detected by a conductivity meter 77 deviates from a preset range, it is possible to supply only water by driving only the metering pump 81, or only antirust by driving only the metering pump 87, to keep the conductivity of the cooling water in the cooling water tank 53 substantially constant.

According to the third embodiment, a configuration similar to that of the second embodiment mentioned above can provide actions and effects similar to those of the second embodiment.

Figure 4:
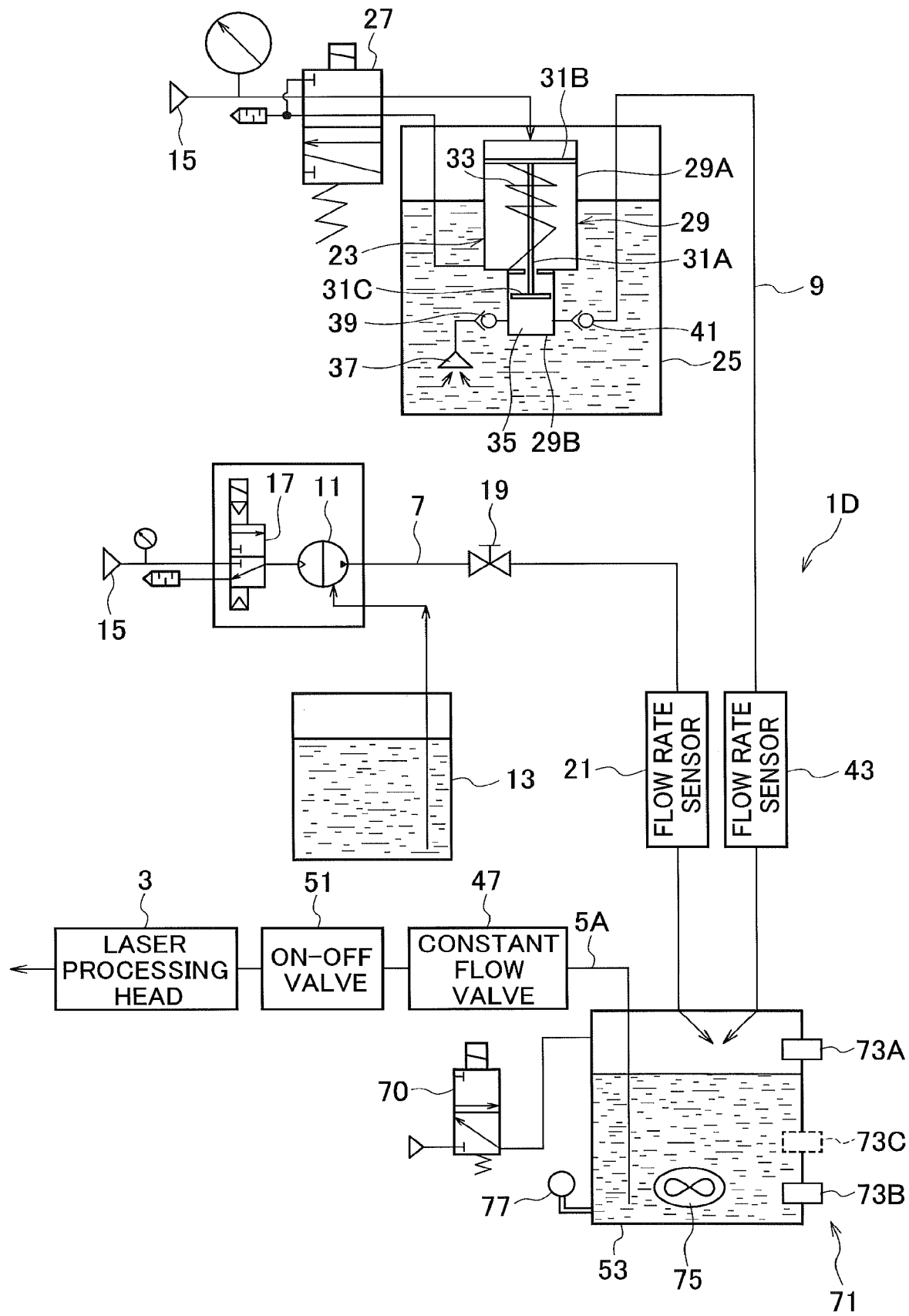
FIG. 4 is an explanatory schematic diagram roughly showing a cooling water supply apparatus according to a fourth embodiment of the present invention.

FIG. 4 schematically and roughly shows a cooling water supply apparatus 1D according to the fourth embodiment of the present invention. In this configuration, components having the same functions as those of the above-mentioned embodiments are represented with the same reference numerals to omit overlapping explanations.

According to the fourth embodiment, a spouting port of a water supply path 7 and a spouting port of an antirust supply path 9 in a cooling water tank 53 are oriented in directions crossing each other. Accordingly, water spouted from the water supply path 7 and antirust spouted from the antirust supply path 9 hit and mix each other in the cooling water tank 53. Accordingly, the water and antirust can effectively be mixed.

This embodiment also provides actions and effects similar to those of the above-mentioned embodiments.

Figure 5:
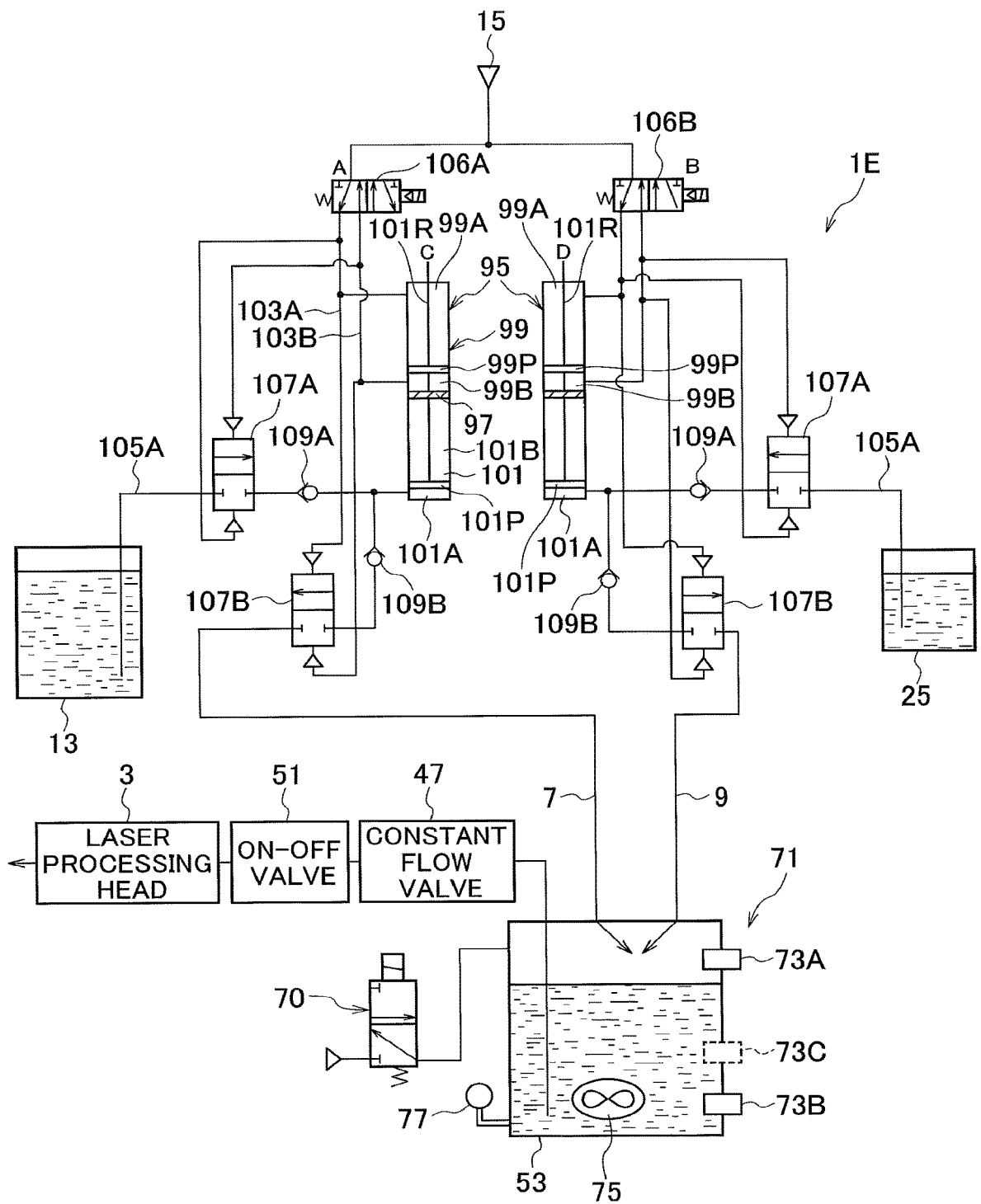
FIG. 5 is an explanatory schematic diagram roughly showing a cooling water supply apparatus according to a fifth embodiment of the present invention.

FIG. 5 schematically and roughly shows a configuration of a cooling water supply apparatus 1E according to the fifth embodiment of the present invention. In this configuration, components having the same functions as those of the above-mentioned embodiments are represented with the same reference numerals to omit overlapping explanations.

According to this embodiment, an air circuit to feed water from a water storage tank 13 to a cooling water tank 53 and an air circuit to feed antirust from an antirust tank 25 have the same configuration to simplify the configuration. In FIG. 5, to draw water from the water storage tank 13 and feed it to the cooling water tank 53, a cylinder pump 95 is arranged.

The cylinder pump 95 is divided by a partition plate 97 into a fluid action chamber 99 and a pump chamber 101. In the fluid action chamber 99, a piston 99P is inserted to freely slide and define a first action chamber 99A and a second action chamber 99B. In the pump chamber 101, a piston 101P is inserted to freely slide and define a pump chamber 101A and an atmospheric chamber 101B opened to atmospheric pressure.

The piston 99P and piston 101P are integrally connected to each other through a piston rod 101R slidably passing through the partition plate 97. An air circuit 103A connected to the first action chamber 99A and an air circuit 103B connected to the second action chamber 99B are optionally connected and disconnected through an electromagnetic changeover valve 106A to and from an air source 15.

To the pump chamber 101A, a drawing circuit 105A is connected to draw water from the water storage tank 13. The drawing circuit 105A is provided with an air pilot type on-off valve 107A and a check valve 109A. To the pump chamber 101A, the water supply path 7 connected to the cooling water tank 53 is connected. The water supply path 7 is provided with a check valve 109B and an air pilot type on-off valve 107B.

A configuration to supply antirust to the cooling water tank 53 from the antirust tank 25 through the antirust supply path 9 is the same, and therefore, components having the same functions are represented with the same reference numerals. Reference numerals are partly omitted and overlapping explanations are omitted.

In the configuration mentioned above, FIG. 5 shows a state that the water supplying and antirust supplying cylinder pumps 95 have fed water and antirust. In this state, the electromagnetic changeover switches 106A and 106B are turned ON to supply air into the second action chambers 99B of the cylinder pumps 95 to lift the pistons 99P and 101P. At the same time, the on-off valves 107A are opened and the on-off valves 107B are closed.

As a result, water in the water storage tank 13 and antirust in the antirust tank 25 are drawn into the pump chambers 101A of the cylinder pumps 95, respectively. Thereafter, the electromagnetic changeover valves 106A and 106B are switched to the state shown in FIG. 5 to supply air into the first action chambers 99A of the cylinder pumps 95 to lower the pistons 99P and 101P. Then, as shown in FIG. 5, the on-off valves 107A are changed to a closed state and the on-off valves 107B to an open state.

Namely, the water and antirust drawn into the cylinder pumps 95 are individually supplied to the cooling water tank 53. Then, the water and antirust hit and mix each other in the cooling water tank 53.

The above-mentioned configuration is capable of individually operating the electromagnetic changeover valves 106A and 106B to supply only water, or only antirust. Namely, a cooling water conductivity in the cooling water tank 53 can be adjusted to a desired value.

Figure 6:
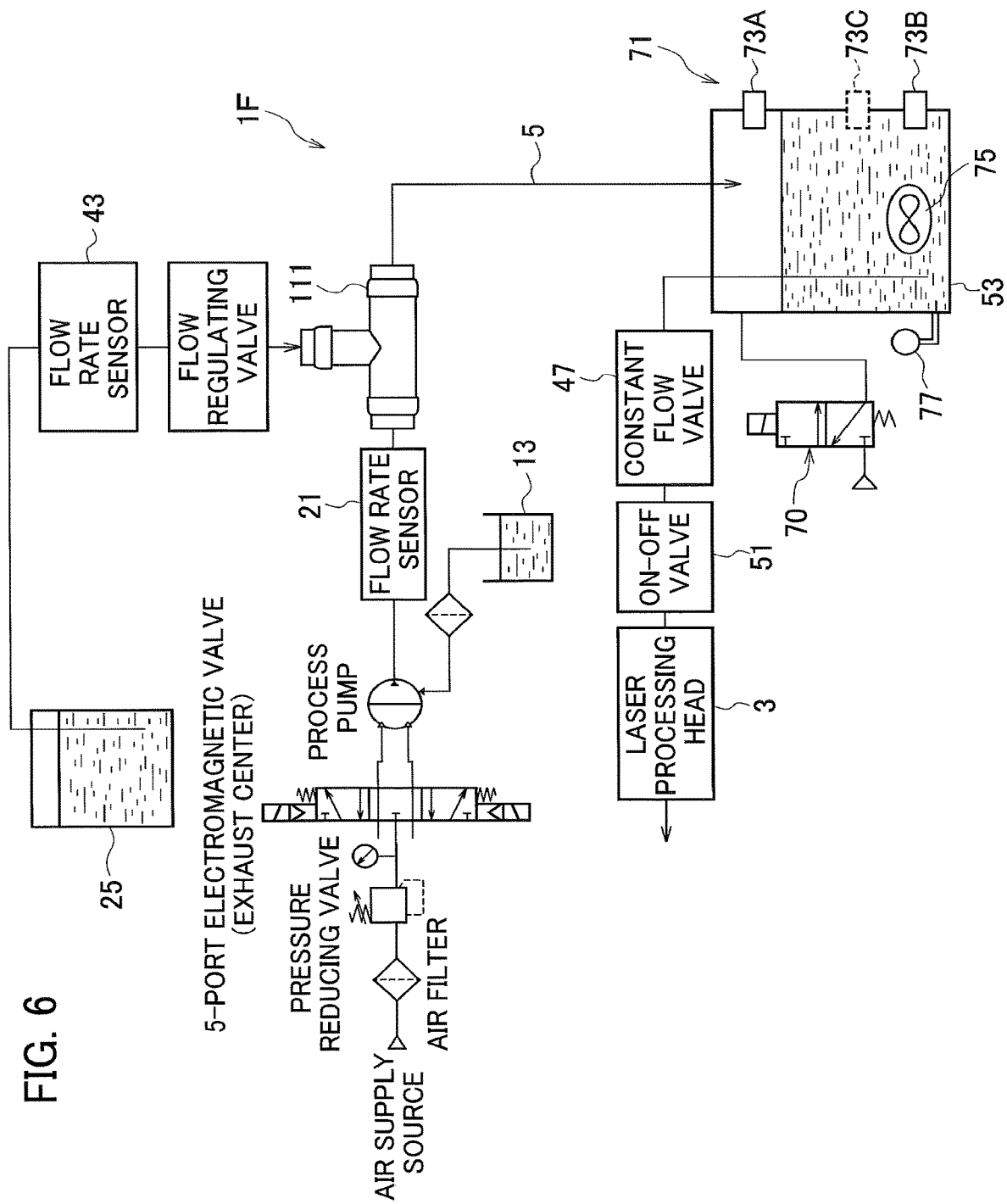
FIG. 6 is an explanatory schematic diagram roughly showing a cooling water supply apparatus according to a sixth embodiment of the present invention.

FIG. 6 schematically and roughly shows a cooling water supply apparatus 1F according to the sixth embodiment of the present invention. According to this embodiment, a cooling water supply path 5 to supply water from a water storage tank 13 to a cooling water tank 53 has an ejector pump 111. The ejector pump 111 draws antirust from an antirust tank 25.

The sixth embodiment is able to provide effects similar to those of the above-mentioned embodiments.

As will be understood from the explanations of the embodiments mentioned above, this embodiment automatically supplies water and antirust with metering pumps as examples of the water feed means and antirust feed means. Accordingly, a water feed quantity and an antirust feed quantity are always maintained at a fixed ratio and mixed. Namely, an antirust concentration in cooling water is always maintained substantially at a fixed value, i.e., a cooling water conductivity is always adjusted to be constant to automatically produce cooling water and continuously supply the same.

As will be already understood, the metering pump may employ a variety of configurations. The mixing means for mixing water and antirust may also employ a variety of configurations. It is acceptable if a water quantity and an antirust quantity are maintained at fixed values and mixed. For example, it is possible to employ a configuration that uses measuring valves to separately measure a water quantity and an antirust quantity and mix them.

Figure 7:
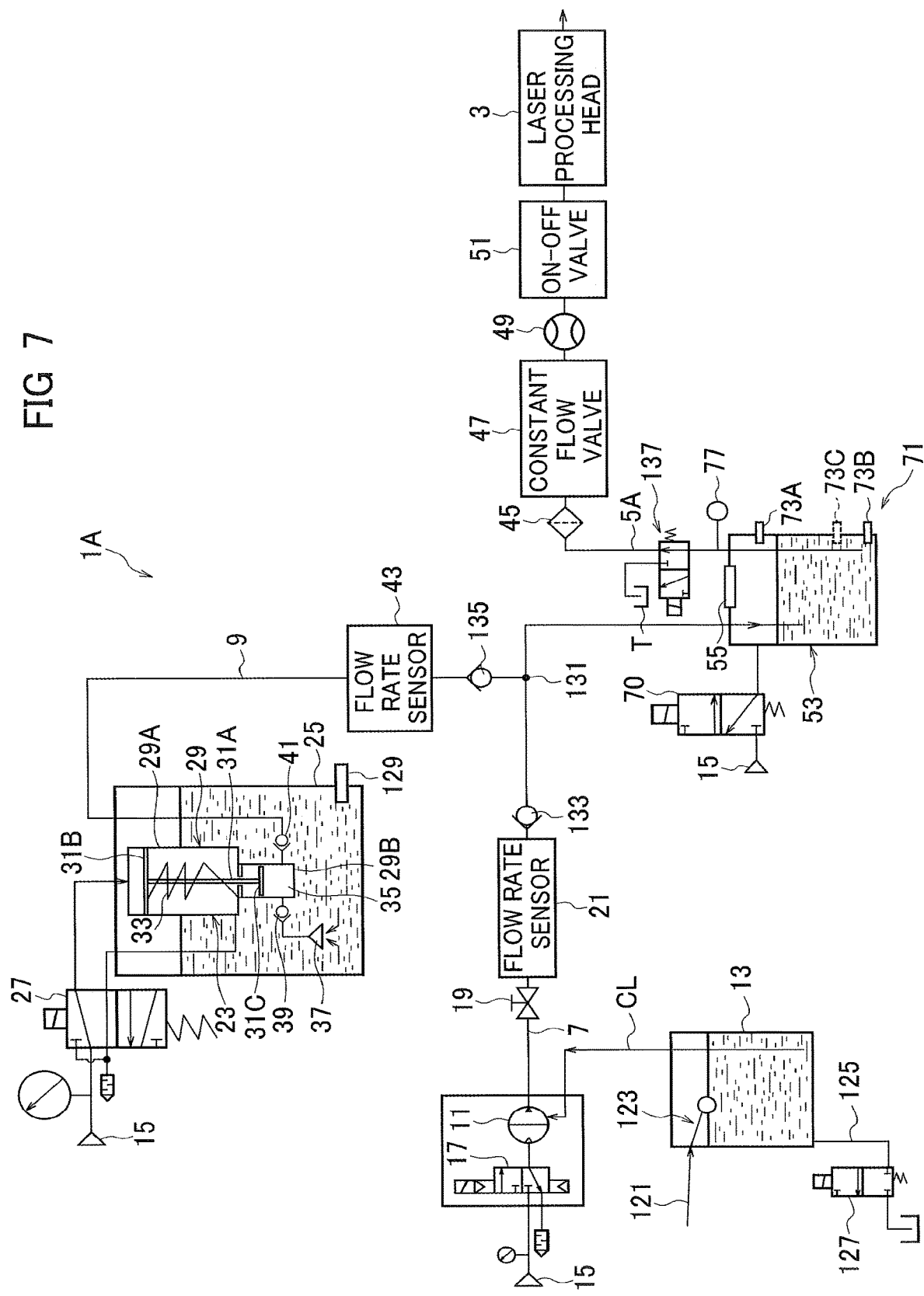
FIG. 7 is an explanatory schematic diagram roughly showing a cooling water supply apparatus according to a seventh embodiment of the present invention.

FIG. 7 schematically and roughly shows a cooling water supply apparatus according to the seventh embodiment of the present invention. In this configuration, components having the same functions as those of the above-mentioned embodiments are represented with the same reference numerals to omit overlapping explanations.

According to the seventh embodiment, a water storage tank 13 is connected to a cooling water replenish path 121 to replenish the water storage tank 13 with cooling water such as pure water and purified water. The water storage tank 13 is provided with a water quantity detection means 123 such as a float switch to detect a stored cooling water quantity.

Accordingly, the water quantity detection means 123 enables the detection of a cooling water quantity stored in the water storage tank 13. The cooling water replenish path 121 is provided with an on-off valve (not shown) such as an electromagnetic valve. Accordingly, the on-off valve allows the cooling water replenish path 121 to be optionally opened and closed.

In the above-mentioned configuration, if the cooling water in the water storage tank 13 decreases lower than a preset stored water quantity, the water quantity detection means 123 detects the water quantity decrease.

Then, it is possible to open the on-off valve and pour cooling water.

When, as a result of the pouring of cooling water, the water quantity detection means 123 detects that a set stored water quantity has been reached, the on-off valve is closed to stop pouring the cooling water.

The bottom of the water storage tank 13 is connected to a discharge path 125 to discharge the cooling water from the water storage tank 13. The discharge path 125 is provided with a solenoid valve 127 to optionally open and close the discharge path 125. Accordingly, if, for example, the cooling water in the water storage tank 13 is not used for a long time and deteriorates, the solenoid valve 127 is opened to discharge the cooling water. In other words, the cooling water in the water storage tank 13 can be replaced with new one.

An antirust tank 25 and a metering pump 23 to feed antirust from the antirust tank 25 according to this embodiment are configured substantially similar to those of the above-mentioned embodiments shown in FIGS. 1, 2, and 4. The antirust tank 25 of this embodiment, however, is provided with a level switch 129 to detect an antirust quantity (residual quantity) in the antirust tank 25. Accordingly, it is possible to detect an antirust residual quantity in the antirust tank 25, and if necessary, replenish the tank with antirust. Replenishing the antirust tank 25 with antirust can be made manually, or automatically when an antirust liquid surface decreases lower than a preset level.

This embodiment arranges, on an upstream side of a junction 131 where a water supply path 7 meets an antirust supply path 9, backflow check valves 133 and 135, respectively. Accordingly, the cooling water never flows into the antirust supply path 9, or the antirust never flows into the water supply path 7.

This embodiment provides a cooling water supply path 5A connected to a cooling water tank 53 with a conductivity meter 77 to detect a cooling water conductivity supplied from the cooling water tank 53 to the cooling water supply path 5A. Accordingly, it is possible to detect the conductivity of the cooling water supplied to the cooling water supply path 5A.

On a downstream side of the conductivity meter 77, there is arranged a changeover valve 137 such as a solenoid valve to optionally open and close the cooling water supply path 5A and optionally connect to a discharge tank T. When the changeover valve 137 is changed to discharge cooling water from the cooling water tank 53 to the discharge tank T, the conductivity meter 77 is capable of detecting a conductivity of the cooling water. Accordingly, it is possible to detect the cooling water conductivity before supplying the cooling water to a laser processing head 3.

By the way, if a cooling water storing time in the cooling water tank 53 becomes long (if the cooling water is unused for a long time), the changeover valve 137 is connected to the discharge tank T to discharge the cooling water from the cooling water tank 53. At this time, the solenoid valve 127 connected to the water storage tank 13 is opened to also discharge cooling water from the water storage tank 13.

Namely, the cooling water in the water storage tank 13 and the cooling water in the cooling water tank 53 can be discharged. In other words, the cooling water such as pure water in the water storage tank 13 can be replaced with new one. Also the cooling water (a mixture of water and antirust) in the cooling water tank 53 can be replaced with new one. As a result, a cooling water conductivity in the cooling water tank 53 can always be maintained substantially at a fixed value.

Figure 8:
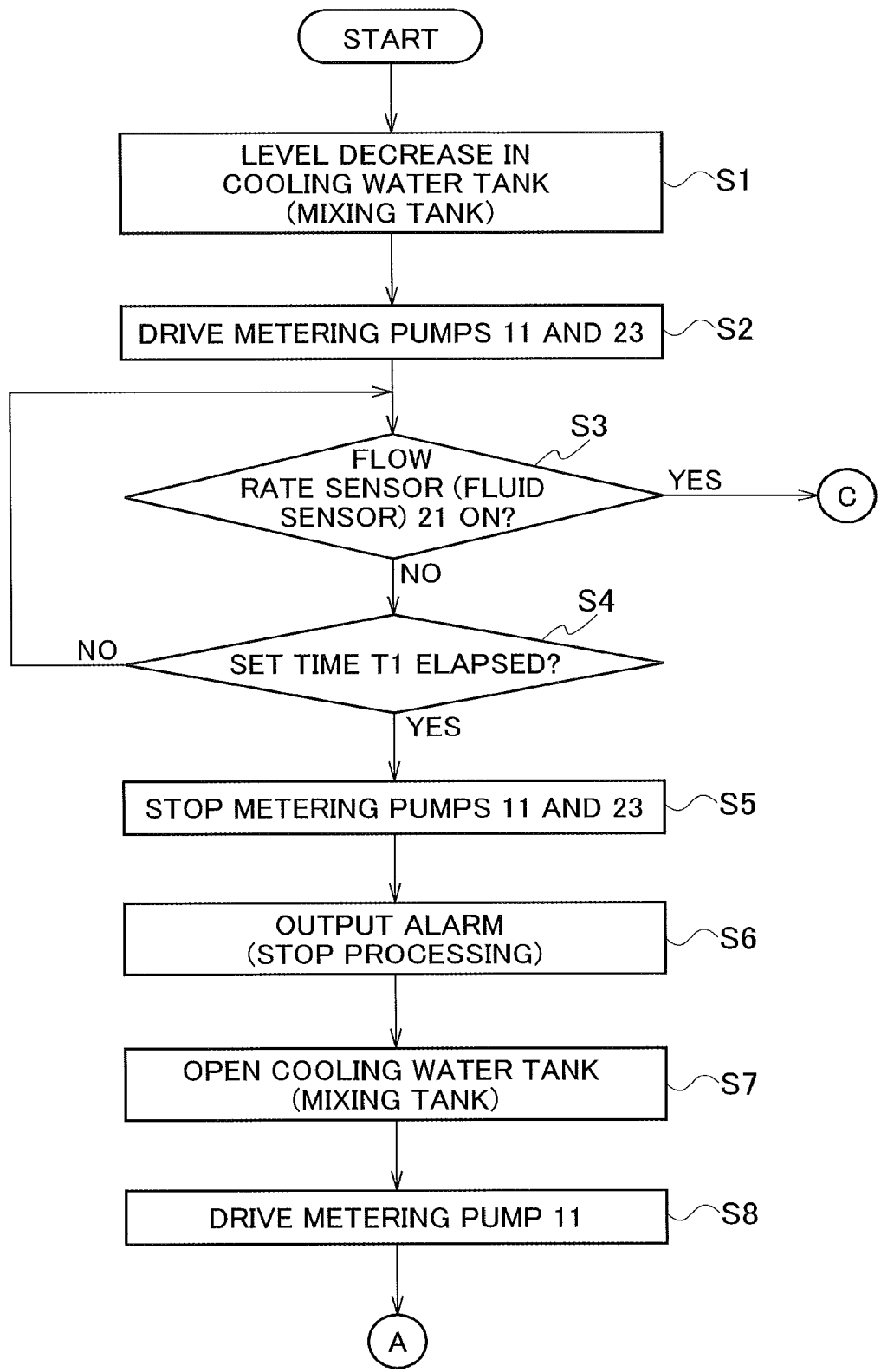
FIG. 8 is an operation flowchart of the cooling water supply apparatus according to the seventh embodiment.
Figure 9:
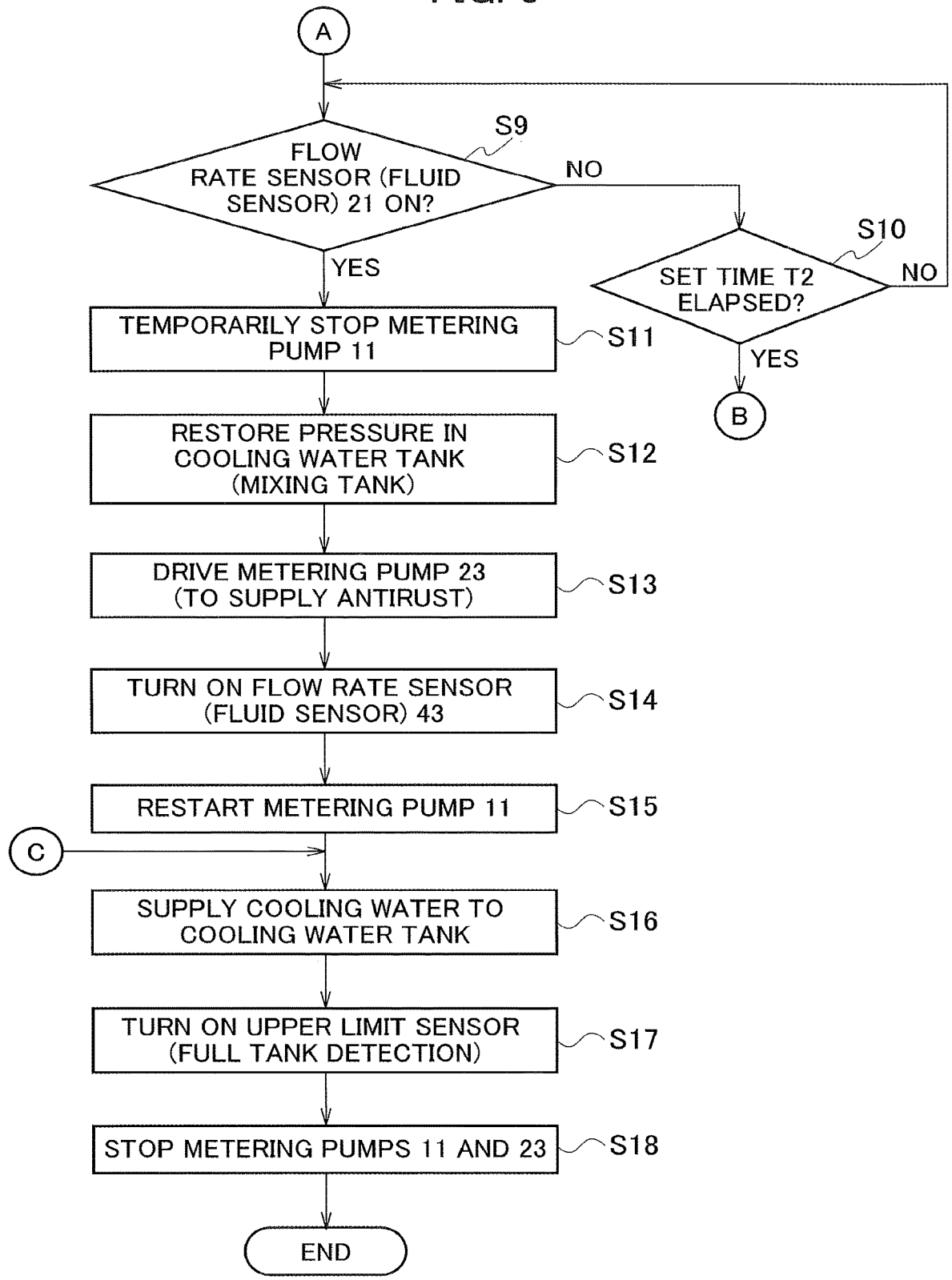
FIG. 9 is an operation flowchart of the cooling water supply apparatus according to the seventh embodiment.

With the above-mentioned configuration, when the cooling water in the cooling water tank 53 decreases so that a lower limit sensor 73B detects a residual cooling water quantity, the cooling water tank 53 is replenished with cooling water under the control of a control unit (not shown) formed with, for example, a computer. Namely, as shown in FIGS. 8 and 9, if the lower limit sensor 73B detects that a cooling water residual quantity is small (step S1), a metering pump 11 serving as a feed means and a metering pump 23 serving as an antirust feed means are driven (step S2). As a result, water fed from the metering pump 11 and antirust fed from the metering pump 23 are mixed at a fixed ratio to replenish the cooling water tank 53. When a cooling water surface in the cooling water tank 53 is detected by an upper limit sensor 73A, it is determined that the cooling water tank 53 is fully filled and the replenishing of the cooling water tank 53 with cooling water is stopped.

As mentioned before, at the time of replenishing the cooling water tank 53 with cooling water, whether or not water from the metering pump 11 is normally fed is detected according to an ON operation of a flow rate sensor 21 (step S3). Then, the cooling water tank 53 is replenished with cooling water.

Here, if the on-off valve provided for the cooling water replenish path 121 connected to the water storage tank 13 is erroneously closed, the water storage tank 13 is not replenished with cooling water and becomes empty in the end. Also, if piping of a connection path CL connecting the water storage tank 13 and metering pump 11 to each other is kept twisted, or kept disconnected, the discharging of cooling water from the metering pump 11 will stop. Further, if air enters into the connection path CL at the time of, for example, maintenance and inspection, the discharging of cooling water from the metering pump 11 becomes impossible.

Accordingly, if the flow rate sensor 21 is not ON in the step S3, step S4 determines whether or not a preset time T1 has elapsed, and if the preset time T1 has elapsed, the metering pump 11 and metering pump 23 are stopped (step S5). Then, an alarm is outputted and laser processing is stopped (step S6).

After stopping the metering pumps 11 and 23 to stop replenishing the cooling water tank 53 with cooling water as mentioned above, an on-off valve 70 is opened to open the cooling water tank 53 to atmospheric pressure so that cooling water may easily flow into the cooling water tank 53 (step S7). After the cooling water tank 53 is opened to atmospheric pressure, the metering pump 11 is started (step S8). In response to an ON operation of the flow rate sensor 21, it is detected that the metering pump 11 is discharging (step S9). At this time, it is monitored whether or not the discharging has been detected within a preset time T2 (step S10).

If the flow rate sensor 21 detects the discharging of the metering pump 11, the metering pump 11 is temporarily stopped (step S11). Thereafter, the pressure in the cooling water tank 53 is returned to a previous internal pressure (step S12). Then, the metering pump 23 is driven to start feeding antirust (step S13). If an antirust flow is detected by a flow rate sensor 43 (step S14), the metering pump 11 is restarted (step S15).

As mentioned above, when the metering pumps 11 and 23 are restarted, the cooling water tank 53 is replenished with cooling water that is a mixture of water and antirust (step S16). When the upper limit sensor 73A of the cooling water tank 53 detects a liquid surface (step S17), it is determined that the tank is full and the metering pumps 11 and 23 are stopped (step S18).

Figure 10:
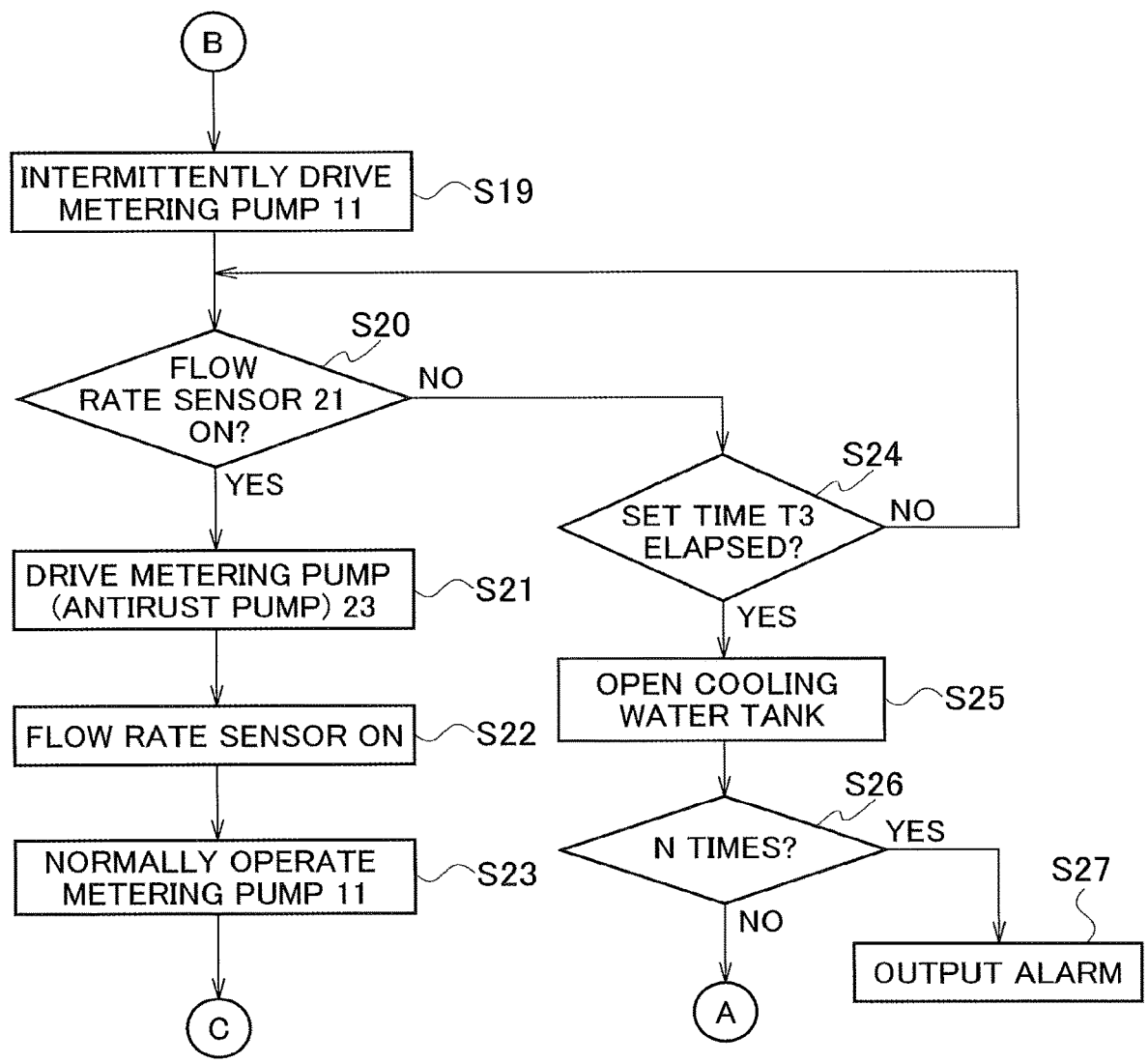
FIG. 10 is an operation flowchart of the cooling water supply apparatus according to the seventh embodiment.

If the set time T2 elapses in the step S10, the metering pump 11 is changed to an intermittent operation as shown in FIG. 10 (step S19).

Then, it is determined whether the flow rate sensor 21 is ON or OFF (step S20). If it is ON, the metering pump (antirust pump) 23 is driven (step S21). When the flow rate sensor 43 detects an antirust flow (step S22), the metering pump (pure water pump) 11 is changed from the intermittent operation to a normal operation (step S23). Then, the cooling water tank 53 is replenished with cooling water (mixed water).

If the step S20 is NO, step S24 monitors to see if a set time T3 has elapsed. If it is NO, it returns to the step S20, and if YES, the cooling water tank 53 is again opened to atmospheric pressure so that cooling water may easily flow therein (step S25). Then, it is determined whether or not the number of repetitions of the opening of the cooling water tank 53 and the intermittent operation of the metering pump 11 (the number of loops along the steps S9, S10, S19, S20, S24, S25, S26 (S9)) is N (step S26). If the step S26 is NO, it advances to the step S9.

If the step S26 is YES, it advances to step S27 to output an alarm to inform a worker of an abnormality and ends.

By the way, the cooling water supply circuit 5A from the cooling water tank 53 is provided with the conductivity meter 77. Accordingly, it is possible to detect a cooling water conductivity supplied to the laser processing head 3. Accordingly, if the detected conductivity is appropriate, discharge quantities of the metering pumps 11 and 23 will be kept constant.

If the conductivity exceeds an appropriate value, the antirust metering pump 23 is stopped and the pure water supplying metering pump 11 is driven to supply water from the water storage tank 13 to the cooling water tank 53, to make the cooling water in the cooling water tank 53 keep the appropriate conductivity. On the other hand, if the conductivity is lower than the appropriate value, the metering pump 11 is stopped and only the metering pump 23 is driven to supply antirust to the cooling water tank 53. As a result, the cooling water conductivity in the cooling water tank 53 is always maintained at the appropriate value.

As is understood from the above explanation, if an abnormality is detected from, for example, the supply of cooling water from the metering pump 11, the cooling water tank 53 is opened to atmospheric pressure. Accordingly, the discharge of cooling water from the metering pump 11 can smoothly be restarted. When the discharge of cooling water from the metering pump 11 is confirmed, the internal pressure of the cooling water tank 53 is returned to an initial state. Thereafter, the metering pump 11 is temporarily stopped and the antirust metering pump 23 is driven. When the supply of antirust is confirmed by the flow rate sensor 43, the metering pump 11 is restarted to restore a normal operation state.

Accordingly, the embodiment is able to carry out automatic replenishment when the cooling water in the cooling water tank 53 decreases. If an abnormality is detected in water feed from the metering pump 11 in a water replenishing system from the water storage tank 13, the embodiment is able to restore a normal state.

INDUSTRIAL APPLICABILITY

The present invention is able to supply, to a laser processing head, cooling water that always has a constant ratio between water and antirust.

The invention claimed is:

1. A method of supplying cooling water to a laser processing head, the method comprising:
   providing a cooling water supply path connected to the laser processing head,
   providing a discharge tank,
   connecting, to the cooling water supply path, a water supply path for supplying water and an antirust supply path for supplying antirust,
   keeping constant a ratio between a water quantity fed by a water feeder connected to the water supply path and an antirust quantity fed by an antirust feeder connected to the antirust supply path,
   mixing the water and antirust in the cooling water supply path,
   providing a changeover valve that selectively opens and closes the cooling water supply path,
   operating the changeover valve to discharge the cooling water to the discharge tank and detecting a conductivity of the cooling water before supplying the cooling water to the laser processing head,
   in a state where the conductivity of the cooling water is within a preset range, operating the changeover valve to supply the cooling water to the laser processing head, and
   providing a feed capacity of the antirust to be smaller than a feed capacity of the water.

2. The method of supplying cooling water according to claim 1, wherein, in the cooling water supply path, a cooling water tank for storing cooling water is provided and the water and antirust are mixed in the cooling water tank.

3. The method of supplying cooling water according to claim 1, wherein, in the cooling water supply path, a cooling water tank is provided for storing cooling water and the water supply path for supplying water and the antirust supply path for supplying antirust are connected to a mixed solution supply path connected to the cooling water tank, and water fed by the water feeder connected to the water supply path and antirust fed by the antirust feeder connected to the antirust supply path are mixed in the mixed solution supply path and the mixed cooling water is stored in the cooling water tank.

4. A method of supplying cooling water to a laser processing head, the method comprising:
   providing, in a cooling water supply path connected to the laser processing head, a cooling water tank for storing cooling water,
   providing a discharge tank,
   connecting, to the cooling water tank, a water supply path for supplying water and an antirust supply path for supplying antirust, mixing, in the cooling water tank, water fed by a water feeder connected to the water supply path and antirust fed by an antirust feeder connected to the antirust feed path, adjusting a water feed quantity and/or an antirust feed quantity so that a conductivity of the cooling water in the cooling water tank comes within a preset range, providing a changeover valve that selectively opens and closes the cooling water supply path, operating the changeover valve to discharge the cooling water to the discharge tank and detecting the conductivity of the cooling water before supplying the cooling water to the laser processing head, maintaining the conductivity of the cooling water within the preset range, in a state where the conductivity of the cooling water is within the preset range, operating the changeover valve to supply the cooling water to the laser processing head, and providing a feed capacity of the antirust to be smaller than a feed capacity of the water.

5. A method of producing laser processing cooling water, the method comprising:

providing a laser processing head, connecting, to a cooling water tank for storing cooling water that is a mixture of water and antirust, a water supply path for supplying the water and an antirust supply path for supplying the antirust, providing a discharge tank, providing a changeover valve that selectively opens and closes the cooling water supply path, operating the changeover valve to discharge the cooling water to the discharge tank and detecting a conductivity of the cooling water before supplying the cooling water to the laser processing head, substantially keeping constant a ratio between a water quantity supplied from the water supply path and an antirust quantity supplied from the antirust supply path, mixing and storing the water and antirust in the cooling water tank, in a state where the conductivity of the cooling water is within a preset range, operating the changeover valve to supply the cooling water to the laser processing head, and providing a feed capacity of the antirust to be smaller than a feed capacity of the water.

6. A method of producing laser processing cooling water, the method comprising:

providing a laser processing head, connecting a mixed water supply path to a cooling water tank for storing cooling water that is a mixture of water and antirust, providing a discharge tank, connecting, to the mixed water supply path, a water supply path for supplying the water and an antirust supply path for supplying the antirust, providing a changeover valve that selectively opens and closes the cooling water supply path, operating the changeover valve to discharge the cooling water to the discharge tank and detecting a conductivity of the cooling water before supplying the cooling water to the laser processing head, substantially keeping constant a ratio between a water quantity supplied from the water supply path and an antirust quantity supplied from the antirust supply path, mixing the water and antirust in the mixed water supply path, storing the mixed cooling water in the cooling water tank, in a state where the conductivity of the cooling water is within a preset range, operating the changeover valve to supply the cooling water to the laser processing head, and providing a feed capacity of the antirust to be smaller than a feed capacity of the water.

7. The method of producing laser processing cooling water according to claim 5, wherein pure water purified from tap water through a pure water unit is employed as the water.

8. The method of producing laser processing cooling water according to claim 5, wherein supplying the water and antirust supplied to the cooling water tank is achieved by keeping constant a ratio between a water quantity and an antirust quantity during a period from a stored water quantity detector provided for the cooling water tank detects a preset decrease until the water quantity detector detects a preset increase, or until a preset time elapses, or until a flow rate meter provided for the water supply path and a flow rate meter provided for the antirust supply path detect preset flow rates.

9. The method of producing laser processing cooling water according to claim 5, wherein the water and antirust supplied to the cooling water tank is achieved by measuring, with a water meter, a cooling water quantity supplied from the cooling water tank to the laser processing head and after the measured value reaches a preset quantity.

10. A method of producing laser processing cooling water, the method comprising:

providing a laser processing head, providing a cooling water tank for storing cooling water that is a mixture of water and antirust, connecting, to the cooling water tank, a water supply path for supplying water and an antirust supply path for supplying the antirust, providing a discharge tank, mixing the water supplied from the water supply path and the antirust supplied from the antirust supply path to produce the cooling water, providing a changeover valve that selectively opens and closes the cooling water supply path, operating the changeover valve to discharge the cooling water to the discharge tank and detecting the conductivity of the cooling water before supplying the cooling water to the laser processing head, adjusting a supply quantity of the water and/or of the antirust to maintain the conductivity within a preset range, in a state where the conductivity of the cooling water is within the preset range, operating the changeover valve to supply the cooling water to the laser processing head, and providing a feed capacity of the antirust to be smaller than a feed capacity of the water.

11. The method of supplying cooling water according to claim 1, further comprising replacing the cooling water with replacement cooling water in a state where the cooling water is detected to be outside of the preset range.

12. The method of supplying cooling water according to claim 4, further comprising replacing the cooling water with replacement cooling water in a state where the cooling water is detected to be outside of the preset range.

13. The method of supplying cooling water according to claim 5, further comprising replacing the cooling water with replacement cooling water in a state where the cooling water is detected to be outside of the preset range.

14. The method of supplying cooling water according to claim 10, further comprising replacing the cooling water with replacement cooling water in a state where the cooling water is detected to be outside of the preset range.

15. The method of supplying cooling water according to claim 1, wherein
the antirust feeder works with a cylinder main body and a piston and is configured to supply a given volume of antirust to the antirust supply path.

16. The method of supplying cooling water according to claim 4, wherein
the antirust feeder works with a cylinder main body and a piston and is configured to supply a given volume of antirust to the antirust supply path.

\* \* \* \* \*